United States Patent Office
3,586,552
Patented June 22, 1971

3,586,552
PROPELLANT COMPOSITION HAVING A CURABLE ETHYLENE INTERPOLYMER BINDER
James E. Potts, Millington, and Arnold C. Ashcraft, Jr., Somerset, N.J., and Edgar W. Wise, Charleston, W. Va., assignors to Union Carbide Corporation
No Drawing. Continuation-in-part of abandoned application Ser. No. 481,907, Aug. 23, 1965. This application May 23, 1968, Ser. No. 733,218
Int. Cl. C06d 5/06
U.S. Cl. 149—19
42 Claims

ABSTRACT OF THE DISCLOSURE

Curable solid fuel propellant composition having as the binder a saturated hydrocarbon prepolymer having reactive functional groups at the ends of each polymer molecule comprising a free-radical initiated interpolymer of ethylene and an alpha-olefin having the formula

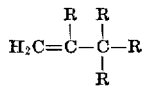

wherein each R individually represents hydrogen, an alkyl group of 1 to 6 carbon atoms or fluorine and a cross-linking agent capable of reacting with the reactive functional groups.

---

This application is a continuation-in-part of copending application Ser. No. 481,907, filed Aug. 23, 1965, now abandoned.

The invention described herein was made in the performance of work under a NASA contract and is subject to the provision of Section 305 of the National Aeronautics and Space Act of 1958, Public Law 85–568 (72 Stat. 435; 42 U.S.C. 2457).

BACKGROUND

This invention relates to a solid fuel propellant composition comprising a solid fuel, an oxidant and an amorphous, saturated hydrocarbon binder. The term "solid fuel propellant composition" is intended to cover a solid system wherein a solid fuel and a solid oxidant are held in a random network by the binder and so-called hybrid systems wherein a solid fuel is held in a random network by the binder and a fluid oxidant is fed thereto at the time of combustion from an adjacent source.

Solid propellant compositions are more desirable than liquid propellant compositions in that they provide greater safety in handling and storing, fire more rapidly, and are free of complex pumps and valves. Solid propellant compositions are generally prepared by mixing the fuel and oxidant with a liquid prepolymer and a cross-linking agent for the prepolymer. The mixture is then poured into a rocket casing and allowed to cure for several days generally at temperatures of from 70° F. to 150° F. Presently used binders such as polyurethanes and carboxy containing polybutadiene and the like are deficient in storage life, energy content due to the presence of unsaturation in the binder molecules and are incompatible with high energy oxidants such as nitronium perchlorate.

SUMMARY

The present invention provides a binder which is a saturated hydrocarbon prepolymer having a carbon to hydrogen ratio of substantially 1 to 2, exclusive of reactive functional groups, and thus provides a binder having the highest possible fuel value, heretofore unattainable with prior binders. The prepolymer binder of this invention is a pourable liquid at temperatures of 25–50° C. and thus can be readily mixed with fuel and oxidant. The prepolymer binder is characterized by sufficient functionality to be satisfactorily cross-linked and has a narrow molecular weight distribution plus the widest possible separation of functional groups, that is, on the terminal repeating unit of each prepolymer molecule. The prepolymer also exhibits good adhesion to fuel, oxidant and rocket casing. The cured binder of this invention is characterized by excellent resistance to heat, hydrolysis and oxidation. It is compatible with high energy oxidants such as nitronium perchlorate and thus has an extended storage life of beyond five years. The cured binder is completely amorphous and remains so over long periods of time. The cured binder has good low temperature flexibility and exhibits sufficient stiffness at elevated temperatures. From the foregoing, it is evident that the binder of the present invention is an ideal one which fulfills all of the requirements prior binders have heretofore only partially satisfied.

Curable solid fuel propellant compositions of this invention have as the binder therefor an amorphous, liquid, saturated hydrocarbon prepolymer comprising a substantially random interpolymer of ethylene and, based on the weight of the interpolymer, from about 30 to about 70 percent by weight of an α-olefin having the formula

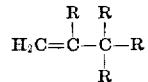

wherein each R individually represents hydrogen, an alkyl group of 1 to 6 carbon atoms inclusive, or fluorine, said interpolymer having an average of from about 1 to about 2 reactive functional groups attached to the terminal carbon atoms of each polymer molecule selected from the group of hydroxyl (—OH) and carboxy (—COOH), and amino (—NH$_2$), and a polyfunctional cross-linking agent having reactive groups capable of reacting at temperatures below about 150° F. with the terminal functional groups of the prepolymer without generating volatile by-products to cure the prepolymer to a three dimensional, amorphous, elastomeric material.

DESCRIPTION

For purposes of this invention, the preferred α-olefin for polymerization with ethylene is determined by the particular binder application. For example, in binder applications in which the chain stiffening effect of the bulky tertiary butyl group is desired the alpha-olefin of choice is 3,3-dimethyl butene-1, also known as neohexene and tertiary butyl ethylene. In binder applications where exceptional chemical resistance is required the monomers of choice are 3,3,3-trifluoropropene-1 or 2-fluoro, 3,3,3-trifluoro propene-1. If it is desired that the polymer exhibit exceptionally low viscosity at a given molecular weight the monomer of choice is propene-1. If exceptional impermeability to gases is required, the monomer of choice is 2-methyl propene-1. If exceptional low temperature flexibility is required the monomer of choice is pentene-1 or hexene-1. In those binder applications where two or more of these properties are desired in the same polymer that monomer is chosen which gives the best balance of properties. Alternately, two or more monomers can be chosen to copolymerize with ethylene to make a terpolymer having the desired balance of properties.

The saturated hydrocarbon prepolymer binders of this invention are prepared, in general, by free radical catalysis reaction of ethylene and an α-olefin as described herein in the presence of an azo or organic peroxide free radical initiator present in an amount sufficient to initiate the free radical polymerization, permit propagation of the polymer chain, and to terminate the chain after the desired molecular weight is attained. The initiator, when used in amounts in excess of normal catalytic amounts, places a reactive functional group at the beginning of the polymer chain upon initiation of the free radical reaction, and then places a second reactive functional group at the other end of the polymer chain when the desired molecular weight is attained thereby terminating polymerization. To achieve these ends, a free radical initiator is generally employed in amounts greatly in excess of normal catalytic amounts (from 0.1 to 2 percent by weight) that is, from about 3 to about 30 percent by weight based on the weight of ethylene and α-olefin. If desired, the amount of initiator required can be reduced by using a chain transfer agent. From about 1 to about 30 percent by weight, preferably from about 1 to 10 percent by weight based on the weight, preferably from about 1 to 10 percent by weight based on the weight of ethylene and alpha-olefin, of a chain transfer agent can be used to terminate polymerization and place a reactive functional group on the terminal carbon atom of the polymer chain.

However, the free radical resulting from the chain transfer reaction must be capable of initiating polymerization the same as free radicals from the initiator. It is preferred to carry out the polymerization, therefore, in the presence of a chain transfer agent to enhance the terminal functionality of the prepolymer. Suitable chain transfer agents include carbon tetrachloride, bromotrichloromethane, carbon tetrabromide, alpha-bromoisobutyric acid, esters of alpha-bromoisobutyric acid such as methyl alpha-bromoisobutyrate, mono-, di and trichloroacetic acid, and like compounds which will undergo halogen transfer reactions with polymer chain radicals.

The polymerization may be either in bulk or solution in which the initiator is usually added as a solution in a suitable solvent. In solution polymerization, a suitable solvent is a solvent for ethylene and the α-olefin, is compatible with the interpolymer formed, and is inert with respect to the reactants and initiator. Aliphatic, aromatic and heterocyclic solvents are suitable as long as they satisfy the foregoing conditions, and oxygen containing solvents such as t-butyl alcohol, dioxane, and tetrahydrofuran are especially suited for use with peroxide initiators.

The conditions of the free radical catalysis are such that chain transfer and homopolymerization of ethylene or α-olefin are minimized. Suitable temperatures are in the range of from 25° C. to 150° C. while pressures can be from 500 to 50,000 p.s.i.g. and preferably from 2000 to 40,000 p.s.i.g. Since molecular weight is a function of pressure, prepolymers of increasing molecular weight can be prepared by employing progressively higher pressures.

The choice of the azo or organic peroxide initiator, and chain terminator, will depend on the reactive functional group to be placed at the terminals of the polymer chain. For example, a carboxy terminated polymer can be prepared using dicarboxylic acid peroxides such as oxalic acid peroxide, sebacoyl peroxide, glutaric acid peroxide, succinic acid peroxide cyclopropane - 1,2 - dicarboxylic acid peroxide and alkyl substituted glutaric and succinic acid peroxides such as, for example, methyl glutaric acid peroxide and the like. These dicarboxylic acid peroxides can be prepared by reacting the dicarboxylic acid anhydrides with about 10 percent hydrogen peroxide at temperatures below 30° C. for a period of two hours or less. Other initiators for producing a carboxy terminated polymer include esters of azobisalkanoic acids such as dimethyl azobisisobutyrate, diethyl azobisisobutyrate, esters of 4,4'-azobis - 4 - cyanopentanoic acid and the like. A suitable chain transfer agent for introducing a terminal carboxy group is alpha-bromoisobutyric acid or the alkyl esters thereof and the like. Terminal carboxy and amino groups can be introduced by using azobisisobutyronitrile as the initiator. This initiator places cyano groups at the terminals of the polymer chain which can then be hydrolyzed in acidic or basic medium to the carboxy group or they can be reduced with lithium aluminum hydride to amino groups. The use of azobisisobutyronitrile for introducing terminal carboxy groups is especially advantageous since it employs a readily available initiator yet results in a hydrolyzed product substantially free of cyano groups. Such a prepolymer binder is especially useful with nitronium perchlorate which reacts with cyano groups. Terminal hydroxyl groups can be introduced by using diethyl-2,2'-azobisisobutyrate (prepared as described in U.S. Pat. 2,877,212) as the initiator which places ethyl carbonyl groups at the terminals of the polymer chain. These groups can then be reduced using lithium aluminum hydride, for example, to hydroxy groups.

Other reactive functional groups besides hydroxyl and carboxy can be attached to the terminal carbon atoms of the prepolymer. For example terminal alkoxycarbonyl groups can be introduced using azobisisobutyronitrile as the initiator. The cyano groups can be subjected to alcoholysis to convert them to alkoxycarbonyl groups (—COOR' wherein R' is lower alkyl). Terminal alkoxycarbonyl groups can also be introduced by using diethyl-2,2'-azobisisobutyrate as the initiator. Reactive functional groups can also be introduced into the prepolymer chain by copolymerization with ethylene and an α-olefin as described herein, a monomer containing the desired functional group. For example, a prepolymer containing carboxy groups can be prepared by reacting ethylene, an α-olefin as described herein, and sufficient amounts of an α-unsaturated mono or dicarboxylic acid such that from 2 to 4 carboxy groups are included in each polymer molecule.

Terminal halogen atoms can be introduced using a halogen containing chain transfer agent as mentioned previously. A terminal halogen atom and a terminal carboxylic acid group can be introduced simultaneously by using a halogen containing carboxylic acid chain transfer agent as mentioned previously. The halogen atom can then be converted by dehydrobromination and subsequent oxidation of the resultant double bond to a carboxylic acid group.

The prepolymer binders of this invention are cured, in general by admixing with about a stoichiometric amount of a polyfunctional cross-linking agent having reactive groups capable of reacting at temperatures below about 150° F. with the terminal functional groups of the prepolymer without generating volatile by-products by which is meant gaseous by-products and by-products having a vapor pressure at atmospheric pressure of 1 mm. of Hg and higher, for example water. Curing is then carried out by heating at 70° F. to 150° C. Suitable cross-linking agents for carboxy terminated prepolymer binders include polyepoxides and polyaziridines (polyimines), for hydroxyl terminated prepolymer binders, polyepoxides, polyaziridines, and polyisocyanates, and for amino terminated prepolymer binders, polyepoxides and polyisocyanates. For purposes of this invention, it is preferred that the cross-linking agent be free of aliphatic or aromatic unsaturation and have a carbon to hydrogen ratio, exclusive of the reactive groups of substantially 1 to 2. Such agents provide cross links in the cured binder having substantially the same desirable properties as the prepolymer.

Suitable polyepoxide cross-linking agents include the triglycidyl ether of para-aminophenol, 2,4-epoxy-6-methylcyclohexylmethyl-3,4-epoxy - 6 - methylcyclohexanecarboxylate, the diglycidyl ether of 2,2-bis-(4-hydroxyphenyl)propane, and the like. Preferred polyepoxides that are free of unsaturation include 1,2,6-hexane tris(3,4-epoxy cyclohexane carboxylate), 3,4-epoxy cyclohexane carboxylic acid triester of trimethylol propane, 2,3-epoxybutane, 1,4-bis glycidyl ether, 1,2,4-trivinyl cyclohexane triepoxide, 1,2,3-tris(methylene cyclohexane oxide) propane, 1,2,6-tris(methylene cyclohexane oxide) hexane, and the like.

Suitable polyaziridine (polyimine) cross-linking agents include tris-(N-methyl ethylene imine)phosphorous oxide (MAPO), tris-(N-methyl ethylene imine phosphorous sulfide (MAPS), and the like. Preferred polyaziridines that are free of unsaturation include 1,2,3-tri-(1-aziridinyl) propane, nitrilo triethyl-β-ethylene imine butyrate, glycerol-tri - α - (1-aziridinyl)butyrate, tetra-(1-aziridinyl) methane, 1,1,1-tri-(1-aziridinyl)2-methylpropane and the like.

Suitable polyisocyanate cross-linking agents include aliphatic and aromatic cross-linking agents such as 2,4-tolylene diisocyanate, 2,6-tolylene diisocyanate, bis(4-isocyanatophenyl)methane, polyphenylmethylene diisocyanates, tolylene triisocyanates, polyethylene triisocyanates and the like.

Any solid fuel used in propellant compositions can be employed with the binder of this invention. Suitable fuels include aluminum, aluminum hydrate, beryllium, beryllium hydrate, and the like. Likewise, any fluid or solid oxidant used in propellant compositions can be employed. Because the binder is saturated, it provides the highest possible fuel value when used with various oxidants. Suitable oxidants, with the specific impulse in seconds attainable with the saturated binder of this invention, include fluorine (325 sec.), oxygen difluoride (350 sec.), oxygen (300 sec.), nitrogen trifluoride (287 sec.), nitronium perchlorate (278 sec.), ammonium perchlorate (252 sec.), and the like.

The following examples are intended to further illustrate the present invention without limiting the same in any manner. All parts and percentages are by weight unless indicated otherwise.

In the examples, the following curable binders are used:

(A) A liquid, amorphous prepolymer comprising an interpolymer of ethylene and 60.3 percent of neohexene having an average of 2.00 carboxy groups attached to terminal carbon atoms, a number average molecular weight (determined by vaper phase osmometry) of 1110, a viscosity (Brookfield) of 25,500 cps., and prepared by reacting 625.5 grams of neohexene with ethylene under 7500 p.s.i.g. in 410 grams of benzene in the presence of 34 grams of azobisisobutyronitrile, AIBN) at 90° for 4.75 hours, followed by acid hydrolysis with 48% HBr.

(B) A liquid, amorphous prepolymer similar to prepolymer A except having terminal hydroxyl groups and prepared using diethyl-2,2'-azobisisobutyrate instead of AIBN followed by reduction with lithium aluminum hydride.

(C) An amorphous prepolymer comprising an interpolymer of ethylene and 50 percent of propylene having an average of about 2 carboxyl groups attached to or adjacent to terminal carbon atoms, a number average molecular weight of 1189, a viscosity of 6830 cps., and prepared by reacting 44.83 percent ethylene with 42.56 percent propylene under 20,000 p.s.i.g. at 110° C. in 11.49 percent benzene in the presence of 0.96 percent alpha-bromoisobutyric acid (BIBA) as chain transfers agent and 0.15 percent dimethyl azobisisobutyrate (DMAB) as initiator. The foregoing percentages are based on the weight of the total charge. The yield is 175 gms. of polymer containing terminal Br atoms and methyl ester groups. Bromine is removed by dehydrobromination and the resulting double bonds are oxidized to —COOH groups. The methyl ester groups are hydrolyzed to —COOH groups.

(D) An amorphous prepolymer comprising an interpolymer of ethylene and 40 percent of isobutylene having an average of about 2 carboxyl groups attached to or adjacent to terminal carbon atoms. A number average molecular weight of 527, a viscosity of 440 cps., and prepared by reacting 434 gms. of ethylene with 580 gms. of isobutylene under 20,000 p.s.i.g. at 90° C. in 139.9 gms. of a 1 to 1 benzene-t-BuOH mixture in the presence of 2.47 grams of AIBN initiator and 28.78 gms. of bromotrichloromethane (BrCCl₃) as chain transfer agent. The yield is 53 grams of polymer containing terminal Br atoms and CCl₃ groups. Bromine is removed by dehydrobromination and the resulting double bonds are oxidized to —COOH groups. The CCl₃ groups are converted to —COOH groups by strong alkaline saponification or treatment with fuming HNO₃.

(E) An amorphous prepolymer comprising an interpolymer of ethylene and 60 percent trifluoropropene having an average of 2.00 carboxyl groups attached to terminal carbon atoms prepared by reacting ethylene and 53 gms. trifluoropropene (66 weight percent) under 15,000 p.s.i.g. for four hours at 90° C. in a benzene -t-BuOH mixture in the presence of 0.14 gm. DMAB initiator and 0.87 gm. t-butylbromoisobutyrate (BBIB) chain transfer agent. The terminal Br atoms and ester groups are converted to —COOH groups as in prepolymer C.

(F) An amorphous prepolymer comprising an interpolymer of ethylene and about 50 percent tetrafluoropropene (CF₃CF=CH₂) having an average of 2.00 carboxyl groups attached to terminal carbon atoms prepared by reacting 34.2 percent ethylene and 65.8 percent tetrafluoropropene under 15,000 p.s.i.g. at 140° C. in benzene in the presence of di-tertiary butyl peroxide initiator. The terminal —COOH groups are generated by oxidation of the polymer with ozone followed by treatment with an oxidizing acid.

The following cross-linking agents are used in the examples:

(AA) 1,2,6-hexane tris-(3,4-epoxy cyclohexane carboxylate), (C₂₇H₃₈O₉).
(BB) 1,2,3-propanetriol tris-(3,4-epoxy cyclohexane carboxylate (C₂₄H₃₂O₉).
(CC) 3,4-epoxy cyclohexane carboxylic acid ester of trimethylol propane (C₂₇H₃₈O₉).
(DD) 2,3-epoxybutane, 1,4-bis-glycidyl ether (C₁₀H₁₆O₅).
(EE) 1,2,4-trivinyl cyclohexane triepoxide (C₁₂H₁₈O₃).
(FF) 1,2,3-tris-(methylene cyclohexane oxide) propane (C₂₄H₃₈O₃).
(GG) 1,2,6-tris-(methylene cyclohexene oxide) hexane (C₂₇H₄₆O₃).
(HH) 1,2,3-tri-(1-aziridinyl)propane.
(II) Nitrilo-triethyl-β-ethylene imine butyrate.
(JJ) Glycerol-tri-α-(1-aziridinyl)butyrate.
(KK) Tetra-(1-aziridinyl)methane.
(LL) 1,1,1-tri-(1-aziridinyl)-2-methylpropane.
(MM) Tris-(N-methyl ethylene imine)phosphorous oxide
(NN) 2,4-tolylene diisocyanate.
(OO) 2,4,6-tolylene triisocyanate.

Cross-linking agents AA, BB, and CC are made by a Diels-Alder reaction of butadiene and acrolein to produce tetrahydrobenzaldehyde which is oxidized to the acid and esterified with an aliphatic trihydroxy compound to produce the aliphatic cyclohexene carboxylic ester which is then epoxidized with peracetic acid. Cross-linking agent DD is made up by ether linking 1,4-butenediol and allyl chloride followed by epoxidation with peracetic acid. Agent EE is made by epoxidizing trivinyl cyclohexene. Agent FF is made by a Grignard reaction of butadiene and allyl chloride followed by epoxidation with peracetic acid. Agent HH is made by reacting 1,2,3-trichloropropane and ethylene imine in basic media. Agent II is made by reacting butyric acid with triethanolamine followed by reacting with 3 moles of ethylene imine. Agent JJ is made by reacting CH₃CH=CHCOCl with 1,2,3-propane triol followed by reacting with 3 moles of ethylene imine. Agent KK is made by reacting ethylene imine with H₅C₂OCOOC₂H₅ to produce dietyhl carbonate which is forced to eliminate ethanol, reacted with one mole of ethylene imine, again forced to eliminate ethanol and lastly, reacted with 2 moles of ethylene imine. Agent LL is made by reacting 3 moles of ehtylene imine with an alkyl ester of isobutyric acid.

In each example the fuel, and oxidant if used, are admixed with a prepolymer and a stoichiometric amount of a cross-linking agent and poured into a one gram size rocket casing and cured at 80° F. for one week. Results are summarized in the table.

TABLE

| Example No. | Fuel | Oxidant | Pre-polymer | Cross-linking agent |
| --- | --- | --- | --- | --- |
| 1 | Al powder | NP [1] | A | AA |
| 2 | do | NP [1] | A | FF |
| 3 | do | NP [1] | A | CC |
| 4 | do | AP [2] | A | GG |
| 5 | do | AP [2] | A | EE |
| 6 | do | None | A | BB |
| 7 | do | AP | A | DD |
| 8 | Al hydride | None | A | HH |
| 9 | do | NP | A | KK |
| 10 | Be powder | None | A | II |
| 11 | do | NP | A | LL |
| 12 | Be hydride | NP | A | MM |
| 13 | do | AP | A | MM |
| 14 | Al powder | None | B | LL |
| 15 | do | AP | B | MM |
| 16 | do | AP | B | II |
| 17 | do | AP | B | KK |
| 18 | do | AP | B | HH |
| 19 | Al hydride | AP | B | DD |
| 20 | do | AP | B | BB |
| 21 | do | AP | B | EE |
| 22 | Be powder | AP | B | GG |
| 23 | do | None | B | CC |
| 24 | do | AP | B | FF |
| 25 | Be hydride | AP | B | AA |
| 26 | do | AP | B | NN |
| 27 | do | AP | B | OO |
| 28 | Al powder | NP | C | MM |
| 29 | Be hydride | NP | C | OO |
| 30 | Al hydride | None | D | AA |
| 31 | Be powder | AP | D | MM |
| 32 | Al powder | AP | E | FF |
| 33 | Be hydride | NP | E | MM |
| 34 | Al hydride | AP | F | GG |
| 35 | Be hydride | NP | F | CC |

[1] Nitronium perchlorate.
[2] Ammonium perchlorate.

In each example, the prepolymer is readily mixed with cross-linking agent, fuel and oxidant, and is poured easily into the rocket casting. The cured composition in each example exhibits excellent adhesion to the fuel, oxidant, and rocket casing, excellent compatibility with the oxidant, that is, it does not undergo attack from the oxidant at temperatures below 50° C., and shows no tendency to crystallize with aging. The cured binder in each example is characterized by good low temperature flexibility, good stiffness at elevated temperatures and good resistance to heat, hydrolysis and oxidation.

The prepolymer binders of this invention can be cross-linked with a difunctional cross-linking agent in the presence of a small amount of a trifunctional carboxylic acid which will react with the reaction product of the difunctional cross-linking agent and prepolymer to produce a loose gel which is capable of binding large amounts, e.g. 85%, of fuel and binder.

A preferred preparation is as follows:

A liquid, amorphous prepolymer comprising an interpolymer of ethylene and propylene in approximately equal proportions by weight having a carboxylic acid group attached at each end of each chain of a molecular weight of about 1000 and a viscosity of about 5000 cps. is prepared by reacting approximately equal weights of ethylene and propylene, using dimethyl azobisisobutyrate as initiator and alpha bromo-isobutyric acid as chain transfer agent. The temperature during reaction is 90–100° C. and the pressure approximately 20,000 p.s.i. The foregoing reaction is carried out under continuous conditions, i.e., the ethylene, propylene, dimethylazobisisobutyrate, alpha bromoisobutyrate ester or acid and a minor amount of benzene are added simultaneously to a hydraulically filled reaction vessel and an equal volume of product is withdrawn continuously.

The resulting polymer is found to contain about one bromine atom per molecule and one ester group per molecule. The ester group is hydrolyzed to a carboxylic acid group by acid or basic hydrolysis. The bromine atom is removed by dehydrohalogenation followed by oxidation of the resulting double bond with ozone and subsequent treatment with an oxidizing acid.

The polymer described above prior to hydrolysis is reduced with lithium aluminum hydride followed by permanganate oxidation to give a polymer having an hydroxyl group at each end of each molecule.

The prepolymers described above are unique in that they are usually low in viscosity when compared to other prepolymers of the same molecular weight. They are also unique in that they have outstanding low temperature properties when compared to other saturated polymers such as those resulting from the hydrogenation of low molecular weight polybutadiene.

The products from the preferred preparation are cured with either aziridinyl compounds such as MAPO or epoxy compounds such as the triglycidyl ether of para amino-phenol. Because of the unusually low viscosity of these prepolymers they are fluid at the low temperatures of cure required in many applications. Because of their freedom from unsaturation these products have exceptional resistance to ozone attack and are useful for sealant and gasketing applications where oxidizing environments are encountered.

What is claimed is:

1. Curable solid fuel propellant composition having as the binder therefor an amorphous, liquid, saturated hydrocarbon prepolymer comprising a substantially random interpolymer of ethylene and, based on the weight of the interpolymer, from about 30 to about 70 percent by weight of an α-olefin having the formula

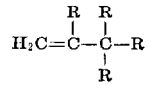

wherein each R individually represents hydrogen, an alkyl group of 1 to 6 carbon atoms inclusive or fluorine, said interpolymer having an average of from about 1 to about 2 reactive functional groups attached to the terminal carbon atoms of each polymer molecule selected from the group of hydroxyl, carboxyl and amino, and a polyfunctional cross-linking agent having reactive groups capable of reacting at temperatures below about 150° F. with the reactive functional groups of said interpolymer without generating volatile by-products.

2. Curable composition of claim 1 wherein said α-olefin is propene-1, 2-methyl propene-1 or 3,3-dimethyl butene-1.

3. Curable composition of claim 1 wherein the reactive functional groups attached to said interpolymer are carboxy groups.

4. Curable composition of claim 1 wherein the reactive functional groups attached to said interpolymers are hydroxyl groups.

5. Curable composition of claim 1 which includes an oxidant selected from the group of fluorine, oxygen difluoride, oxygen, nitrogen trifluoride, nitronium perchlorate, and ammonium perchlorate.

6. Curable composition of claim 1 which includes nitronium perchlorate oxidant.

7. Curable composition of claim 3 which includes nitronium perchlorate oxidant.

8. Curable composition of claim 1 wherein said cross-linking agent is selected from the group of polyepoxides, polyaziridines and polyisocyanates.

9. Curable composition of claim 1 wherein said cross-linking agent is 1,2,6-hexane-tris-(3,4-epoxy cyclohexane carboxylate) having the formula

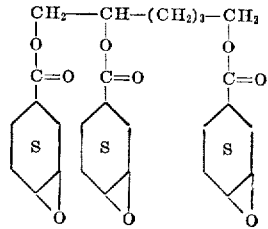

10. Curable composition of claim 1 wherein said crosslinking agent is 1,2,3-propane-triol-tris-(3,4-epoxy-cyclohexane carboxylate) having the formula

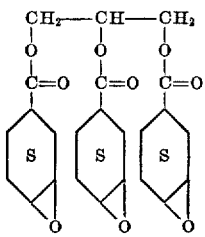

11. Curable composition of claim 1 wherein said crosslinking agent is 3,4-epoxy cyclohexane carboxylic acid ester of trimethylol propane having the formula

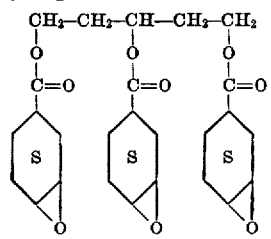

12. Curable composition of claim 1 wherein said crosslinking agent is 2,3-epoxybutane, 1,4-bis-glycidyl ether having the formula

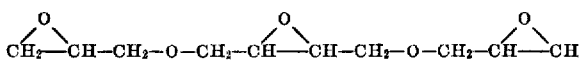

13. Curable composition of claim 1 wherein said crosslinking agent is 1,2,4-trivinyl cyclohexane triepoxide having the formula

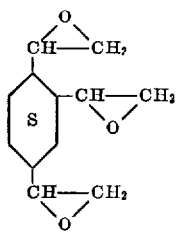

14. Curable composition of claim 1 wherein said crosslinking agent is 1,2,3-tris-(methylene cyclohexane oxide) propane having the formula

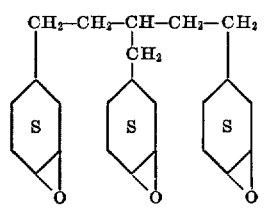

15. Curable composition of claim 1 wherein said crosslinking agent is 1,2,6-tris-(methylene cyclohexene oxide) hexane having the formula

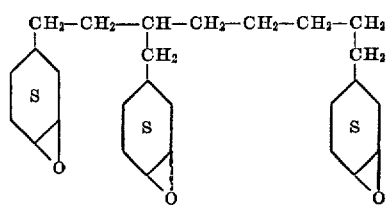

16. Curable composition of claim 1 wherein said crosslinking agent is tris-(N-methyl ethylene imine)phosphorous oxide.

17. Curable composition of claim 1 wherein said crosslinking agent is 1,2,3-tri-(1-aziridinyl)propane having the formula

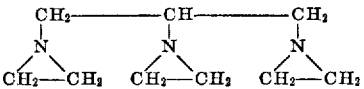

18. Curable composition of claim 1 wherein said crosslinking agent is nitrilo triethyl-β-ethylene imine butyrate having the formula

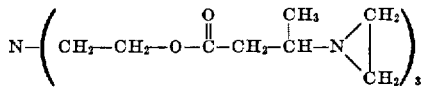

19. Curable composition of claim 1 wherein said crosslinking agent is glycerol-tri-α-(1-aziridinyl)butyrate having the formula

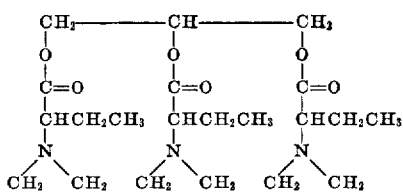

20. Curable composition of claim 1 wherein said crosslinking agent is tetra-(1-aziridinyl)methane having the formula

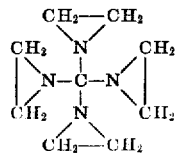

21. Curable composition of claim 1 wherein said crosslinking agent is 1,1,1-tri-(1-aziridinyl)-2-methylpropane having the formula

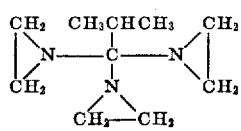

22. The cured composition of claim 1.
23. The cured composition of claim 2.
24. The cured composition of claim 3.
25. The cured composition of claim 4.
26. The cured composition of claim 5.
27. The cured composition of claim 6.
28. The cured composition of claim 7.
29. The cured composition of calim 8.
30. The cured composition of claim 9.
31. The cured composition of claim 10.
32. The cured composition of claim 11.
33. The cured composition of claim 12.
34. The cured composition of claim 13.
35. The cured composition of claim 14.
36. The cured composition of claim 15.
37. The cured composition of claim 16.
38. The cured composition of claim 17.
39. The cured compositioi of claim 18.
40. The cured composition of claim 19.
41. The cured composition of claim 20.
42. The cured composition of claim 21.

References Cited
UNITED STATES PATENTS

| | | | |
|---|---|---|---|
| 3,147,161 | 9/1964 | Abere et al. | 149—19 |
| 3,177,190 | 4/1965 | Hsieh | 260—94.2 |
| 3,255,059 | 6/1966 | Hamermesh et al. | 149—19 |
| 3,257,248 | 6/1966 | Short et al. | 149—19 |
| 3,305,523 | 2/1967 | Burnside | 149—19X |

BENJAMIN R. PADGETT, Primary Examiner

U.S. Cl. X.R.

149—20

UNITED STATES PATENT OFFICE
CERTIFICATE OF CORRECTION

Patent No. 3,586,552      Dated June 22, 1971

Inventor(s) J.E. Potts, A.C. Ashcraft, E.W. Wise

It is certified that error appears in the above-identified patent and that said Letters Patent are hereby corrected as shown below:

Column 9, line 31 (claim 12, last line)

The formula should read:

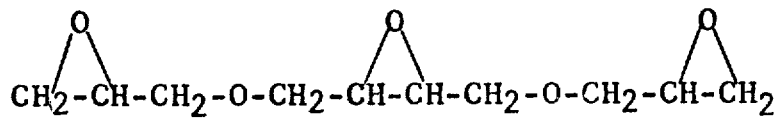

Signed and sealed this 26th day of October 1971.

(SEAL)
Attest:

EDWARD M. FLETCHER, JR.      ROBERT GOTTSCHALK
Attesting Officer      Acting Commissioner of Patents